United States Patent [19]

Johnson

[11] Patent Number: 4,923,263

[45] Date of Patent: May 8, 1990

[54] ROTATING MIRROR OPTICAL SCANNING DEVICE

[75] Inventor: John L. Johnson, Huntsville, Ala.

[73] Assignee: The United States of America as represented by the Secretary of the Army, Washington, D.C.

[21] Appl. No.: 247,555

[22] Filed: Sep. 22, 1988

[51] Int. Cl.$^5$ .............................................. G02B 26/10
[52] U.S. Cl. ..................................... 350/6.9; 250/235
[58] Field of Search .................. 350/6.9, 6.1, 6.5, 6.7; 250/201, 235, 334; 358/88

[56] References Cited

U.S. PATENT DOCUMENTS

| | | | |
|---|---|---|---|
| 3,783,269 | 1/1974 | McConnell | 250/235 |
| 4,196,461 | 4/1980 | Geary | 350/6.9 |
| 4,387,952 | 6/1983 | Slusher | 350/6.9 |

*Primary Examiner*—Bruce Y. Arnold
*Assistant Examiner*—Loha Ben
*Attorney, Agent, or Firm*—Freddie M. Bush; Howard G. Garner

[57] ABSTRACT

An optical scanning device for mechanically scanning images at a high scan rate over a wide field of view and under low light conditions. The device comprises a first rotating reflecting means such as mirrors for intersecting an input beam of light in a first path and for redirecting the beam of light into a second path. A second rotating reflecting means intersects the second path and reflects the beam of light into a third path, onto a detecting device for detecting the presence of predetermined images in the beam of light. In order to reflect the light beams over an elliptical path the mirrors are mounted on rotating shafts at a slight angle from the perpendicular to the axis of the rotating shaft. The mirrors are rotated at varying speed relationships to each other and varying phase relationships to each other in order to produce a variety of scan patterns.

20 Claims, 2 Drawing Sheets

ROTATING MIRROR OPTICAL SCANNING DEVICE

DEDICATORY CLAUSE

The invention described herein may be manufactured, used, and licensed by or for the U.S. Government for governmental purposes without the payment to me of any royalties thereon.

BACKGROUND OF THE INVENTION

This invention relates to an optical scanning mechanism. It has a very large focal plane area coverage and can accept a large f-cone from an external imaging system. It has a scan rate of up to 200 lines per second and can generate several original scan patterns by varying the settings of the invention.

There are numerous mechanical scanning systems which have been built that provide one and two-dimensional image scan patterns for optical systems. These systems range from simple two-axis gimbals and rotating multifaceted cylinders to cam-actuated tilting mirrors or prisms and complex combinations of mirrors, lenses, prisms, and holographic hybrids.

One of these systems uses a pair of counter-rotating prisms in a tube, but this system is strongly wavelength dependent. In all such systems, there is invariably, a trade-off between the optical throughput, the scan rate, and the Field of View (FOV). This problem is particularly acute for systems which must operate at low light levels under conditions which require high (real-time) scan rates and wide fields of view. In such cases the optical designer usually abandons mechanical scan generators in favor of arrays or other non-mechanical means of image generation. However, for some spectral regions, these alternate approaches do not exist. This is true for the very far infrared and submillimeter spectral regions. Furthermore, in these regions, the minimum image resolution spot size is large compared to the visible spectral region. In order to scan an image with enough resolution cells to synthesize patterns, the FOV and the physical area covered in the focal plane must also be large.

SUMMARY OF THE INVENTION

The scanning device of the invention will accommodate a large aperture primary mirror which is necessary in order to collect the incident radiation, and the large focal plane area necessary for scene resolution, while still providing a rapid mechanical scan rate for real-time imaging. In addition, the same scanning device can generate a variety of one and two-dimensional scan patterns simply by varying the mechanical phase and rotational differences between the two rotating mirrors included in the device. Since the device of the invention uses reflective elements to make the scan, it is independent of the wavelength. The focal plane scanner utilizes two relay lenses, but they do not produce the scanning action.

It is an object of the invention to provide an optical scanning mechanism which can scan a large focal plane area and accept a large f-cone from the external imaging system.

It is another object of the invention to provide an optical scanning mechanism which scans a large focal plane area mechanically at a rate of up to 200 lines per second.

It is still a further object of the invention to provide a mechanical optical scanning device which is adjustable and can generate one or more scan patterns by varying the mechanical phase and the rotational velocities of a pair of rotating mirrors.

It is yet another object of the invention to provide a mechanical optical scanning device which is particularly adaptable to scanning a large focal plane area, generated by infrared and submilimeter imaging systems.

These and other objects, which will become apparent, are attained by the mechanical optical scanning device of the invention which is illustrated in the drawings appended hereto, and described in detail in the accompanying specification.

BRIEF DESCRIPTION OF THE DRAWINGS

The invention will now be described in connection with the appended drawings, wherein.

DETAILED DESCRIPTION OF THE DRAWINGS

Figure 1:
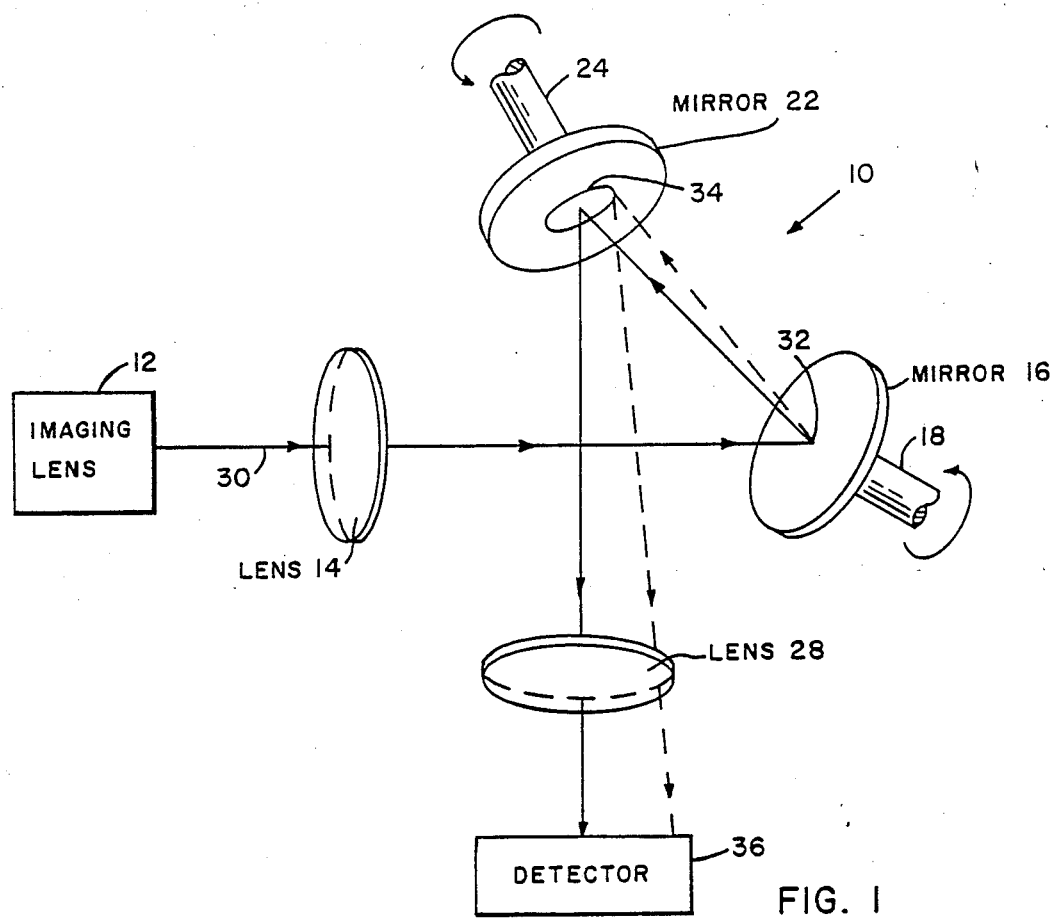
FIG. 1 is a perspective view of the optical scanning device of the invention.
Figure 2:
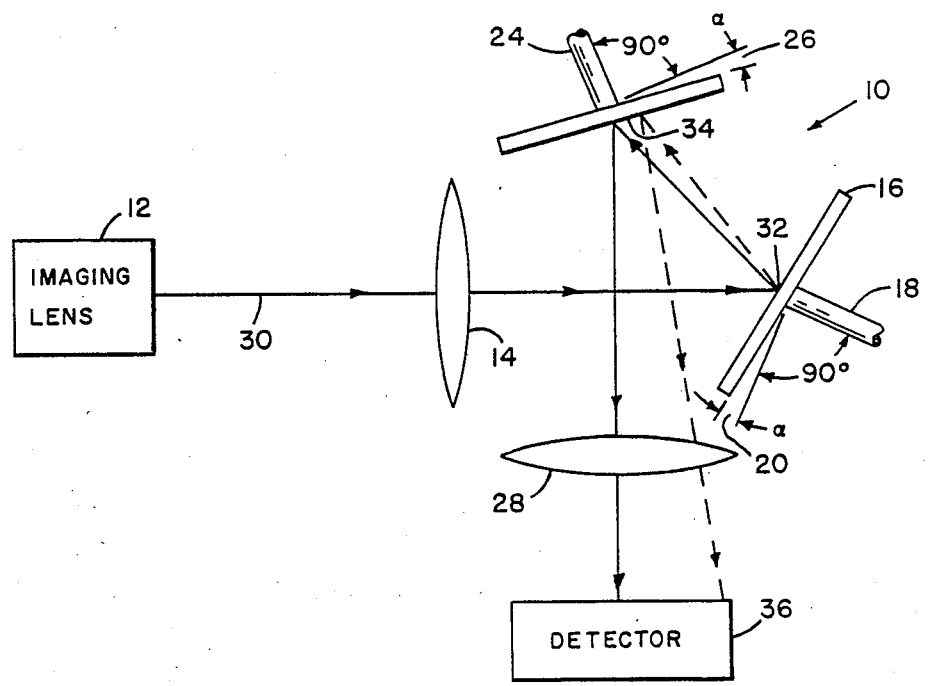
FIG. 2 is a schematic plan view of the optical scanning device illustrated in FIG. 1.
Figure 3:
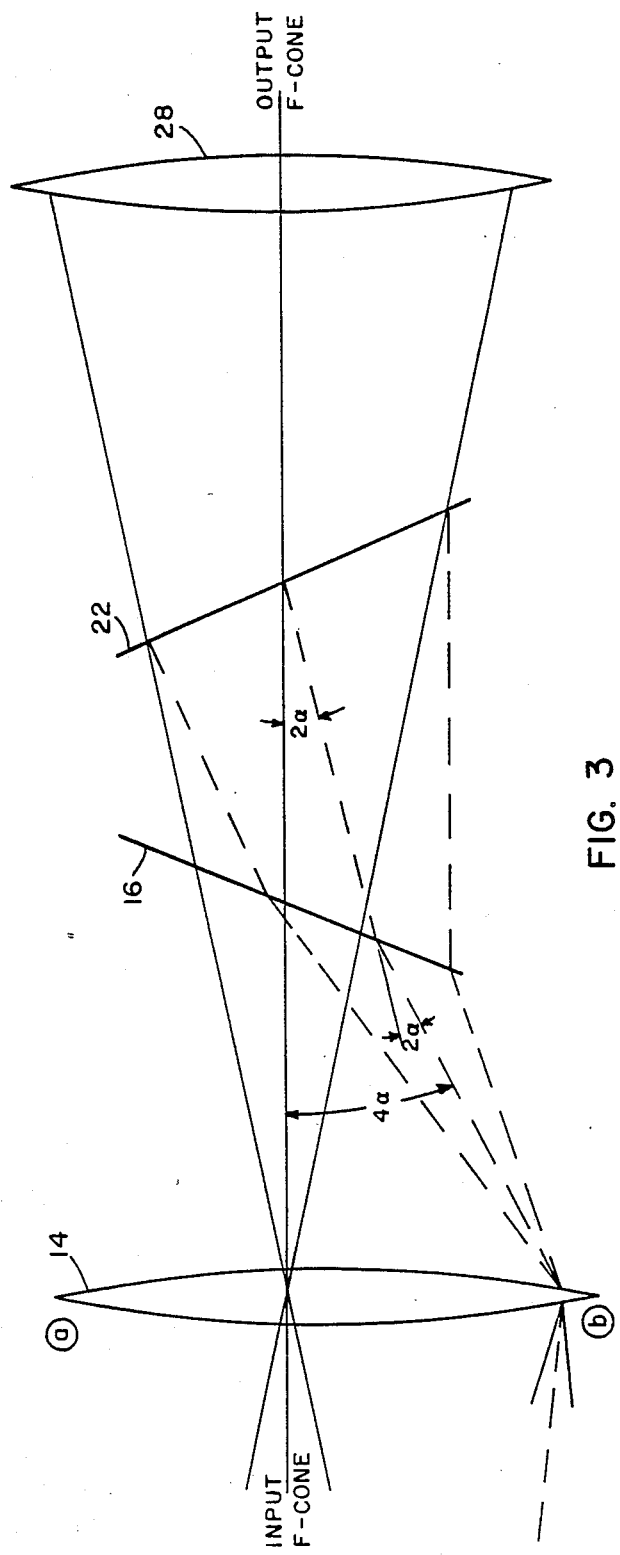
FIG. 3 is a tunnel diagram of the optical throughput of the optical scanning device illustrated in FIGS. 1 and 2.

Referring now to FIGS. 1, 2 and 3, wherein the scanning device 10 of the invention comprises an imaging lens 12 for directing the beam of light to be scanned into the scanning device 10. Imaging lens 12 produces a focused image on the plane in which a field lens 14 lies. The beam of light 30 is directed by field lens 14, onto the surface of a first rotary reflecting mirror 16, which is supported for rotation on a shaft 18. Each ray of the light beam 30 impinges upon a different point on reflecting means 16, and, in turn, is reflected in a second direction or path onto the surface of a second rotary reflecting means 22. As seen best, in FIG. 2, the first rotary reflecting means 16 is a mirror mounted on shaft 18 at an angle of less than 90° to the axis of the shaft so that each ray of light beam 30 which impinges upon surface 16 is reflected in an elongated elliptical path, as at 34.

The second rotary reflecting means 22 is supported on shaft 24 also at an angle $\alpha$ as indicated at 20 so that the rotary reflecting means 22 rotates in a series of planes so as to redirect the elliptical path 34 in a further elongated elliptical path, through a relay lens 28, and onto a detecting means 36. The full line and the dotted line positions in FIG. 1 and FIG. 2 represent the path of a single point or light ray 32 which travels through the scanning device. In the event that the device is to be used to scan the entire aperture of input beam 30, field lens 14 and relay lens 28 may be dispensed with.

Figure 4E:
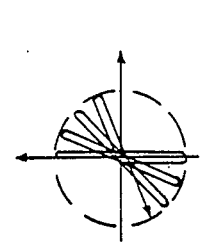
FIG. 4(e) is a graphic representation of the rotating radial scan mode.
Figure 4D:
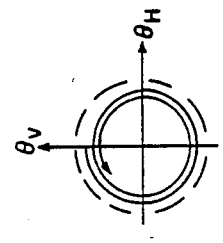
FIG. 4(d) is a graphic representation of the spiral scan mode.

As pointed out above, mirrors 16 and 22 are tilted on their axles or shafts 18 and 24 at an angle $\alpha$ with the axis of their rotary shafts, and their rotational speeds are synchronized with a preset phase difference and sense of rotation. Point 32 of light beam 30 is reflected from mirror 16 in a small elliptical cone as mirror 16 rotates. The axis of the cone is at an angle to the axis of rotation of mirror 16 and has an apex angle of two α. Upon reflection from the second mirror 22, a second conical movement is superimposed on reflected point or ray 32. When the rotations and phases are correctly adjusted, as illustrated in FIG. 4(b), the net angular movement of ray 32 can be controlled so that the vertical movements are substantially cancelled while the horizontal deflections are increased, to produce an elongated substantially flat elliptical path which is substantially tantamount to a straight line scanning motion. This results in the horizontal scan mode illustrated in FIG. 4(b).

Figure 4C:
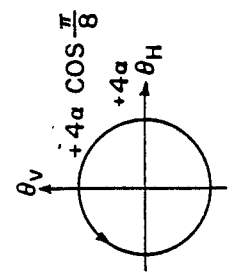
FIG. 4(c) is a graphic representation of the circular scan mode.
Figure 4B:
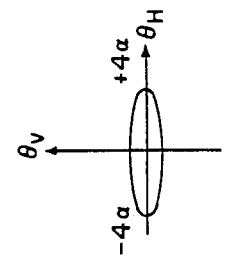
FIG. 4(b) is a graphic representation of the horizontal scan mode.
Figure 4A:
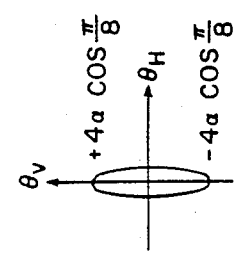
FIG. 4(a) is a graph illustrating the vertical scan mode.

FIG. 4(a) illustrates the vertical scan mode and is similar to the horizontal scan mode illustrated in FIG. 4(b), except that it is in the vertical plane rather than the horizontal plane.

A detailed mathematical analysis shows that, for a small angle α, and the pentaprism geometry of FIG. 1, the horizontal and the vertical angular deflections, $\theta_H$ and $\theta_V$ are given by the following equations:

$$\theta_H 2\alpha[\text{SIN }(W_1T+\beta)°+\text{SIN }W_2T]$$

$$\theta V + 2\alpha \text{COS } 22.5°[\text{COS}(W_1T+\beta+\text{COS }W_2T]$$

where

α = mirror tilt angle, same for both mirrors.
β = relative phase of the direction of tilt between the two mirrors.
$w_1$ = angular velocity of mirror 16
$w_2$ = angular velocity of mirror 22

The field of view of the focal plane scanning embodiment of the invention is established by consideration of the tunnel diagram of FIG. 3. The points (a) and (b) show the maximum coverage of the scanner for a mirror tilt angle and the indicated relative spacing of the mirrors 16 and 22 at field lens 14 and relay lens 28.

As illustrated in FIG. 3, this is a geometrical construction. The focal length of lens 14 is chosen to reimage primary mirror 16 at a point halfway between mirrors 16 and 22. The focal length of lens 28 is chosen to re-image the plane of lens 14 onto the detector means 36. The scan FOV is then determined by specifying the desired ratio of the primary aperture diameter to that of lens 14 for a given f/#. The diagram in FIG. 3 shows that an f/2.5 imaging system can be scanned over an 11.4° FOV if an f/1 field lens 14 and an f/2 relay lens 28 are utilized, and the focal plane diameter ratio to that of the f/2.5 primary mirror 16 is in the ratio of 1:2.

Each revolution of the tilted mirrors yields one complete angular cycle, consisting of one scan line across the FOV and a second scan line back to the starting point, for a total of two scan lines per revolution. Thus, an operating frequency of 6000 rpm gives 100 rps, or 200 lines per second altogether. For an image with a moderate line resolution of 50–100 lines per frame, this gives from two to four frames per second output.

The scanning device of the invention offers a number of advantages over other mechanical scanners. It has a wide FOV, a high scan rate, and a large f-cone acceptance capability. It can also scan very large area focal planes with little or only partial obscuring of the throughput.

The device illustrated in FIGS. 1, 2, and 3 can generate either horizontal or vertical line scans, as described above, but can also be adjusted to scan a two-dimensional FOV in either a rotating radial line scan or a periodic spiral scan pattern, depending upon the settings of the angular velocities and relative phases of the two rotating mirror elements.

As seen in FIG. 4(c), the phase and rotational speeds can be adjusted to provide a circular scan mode without modifying the structure of the scanning device itself.

FIG. 4(d) illustrates a spiral scan mode which may be attained, again by adjusting the speed and phases of the mirrors in accordance with the illustrated formula. FIG. 4(e) illustrates a different scanning pattern wherein a flattened elliptical path such as that shown in FIG. 4(a) and 4(b) is performed by the apparatus, but with the path slowly rotating radially above a center line to produce a rotating radial scan mode.

Each of FIG. 4(a), 4(b), 4(c), 4(d) and 4(e) illustrates the formula for calculating in adjusting the speeds and phases of the rotating mirrors to produce the scan pattern illustrated in each.

I claim:

1. An optical scanning device for scanning light beam which has a very large focal plane area coverage and can accept a large f-cone with a high scan rate, under low light conditions, comprising:
    (a) a field lens disposed in a field lens plane for receiving said light beam and for focusing said light beam along a first path;
    (b) an imaging lens for focusing said light beam onto said field lens in said field lens plane;
    (c) first rotary reflecting means for intersecting said focused light beam in said first path at a angle of less than 90° from an axial direction of said first path for reflecting said focused light beam along a second path;
    (d) second rotary reflecting means for intersecting the beam reflected from said first reflecting means in said second path at an angle of less than 90° from a central axis of said reflected beam, for reflecting said reflected beam along a third path which is different from said second path; and
    (e) detecting means for intersecting the beam reflected from said second rotary reflecting means in said third path for detecting the presence of predetermined images in said reflected beam.

2. An optical scanning device as set forth in claim 1, wherein means are provided to rotate said first and said second rotary reflecting means in timed and phased relationship to each other, to produce an elongated elliptical scan pattern.

3. An optical scanning device as set forth in claim 2, wherein said elliptical scan pattern is in a horizontal plane.

4. An optical scanning device as set forth in claim 2, wherein said elliptical scan pattern is in a vertical plane.

5. An optical scanning device as set forth in claim 2, wherein, said elliptical scan pattern rotates about the center line of said third path.

6. An optical scanning device as set forth in claim 1, wherein means are provided for coordinating the rotation of the said first and second rotary reflecting means to produce a circular scan pattern.

7. An optical scanning device as set forth in claim 6, wherein said circular scan pattern moves in a counter clockwise direction.

8. An optical scanning device as set forth in claim 6, wherein said circular scan pattern moves in a clockwise direction.

9. An optical scanning device as set forth in claim 1, wherein means are provided for coordinating the phases and the rotation of said first and second rotary reflecting means to produce a spiral scanning pattern.

10. An optical scanning device as set forth in claim 9, wherein, said spiral scanning pattern is collapsing on the center of said input beam path.

11. An optical scanning device for scanning a light beam which has a very large focal plane area coverage and can accept a large f-cone with a high scan rate, under lower light conditions, comprising:
 (a) a field lens disposed in a field lens plane for receiving said light beam and for focusing said light beam along a first path;
 (b) an imaging lens for focusing said light beam onto said field lens in said field lens plane;
 (c) first rotary reflecting means for intersecting said focused light beam in said first path at an angle of less than 90° from an axial direction of said first path, for reflecting said focused light beam along a second elongated elliptical path;
 (d) second rotary reflecting mean for intersecting the light beam reflected from said first reflecting means in said second path at an angle of less than 90° from a central axis of said reflected beam, and for reflecting said reflected beam along a third elongated elliptical path; and
 (e) detecting means for intersecting the light beam reflected from said second rotary reflecting means in said third path for detecting the presence of predetermined images in said reflected beam.

12. An optical scanning device as set forth in claim 11, wherein means are provided to rotate said first and said second rotary reflecting means in a timed and phased relationship to each other to produce an elongated elliptical scan pattern.

13. An optical scanning device set forth in claim 12, wherein said elliptical scan pattern is in a horizontal plane.

14. An optical scanning device as set forth in claim 12, wherein said elliptical scan pattern is in a vertical plane.

15. An optical scanning device as set forth in claim 12, wherein said elliptical scan pattern rotates about the center line of said input beam.

16. An optical scanning device for scanning a light beam which has a very large focal plane area coverage and can except a large f-cone with a high scan rate, under low light conditions, comprising:
 (a) a field lens disposed in a field lens plane for receiving said light beam and for focusing said light beam along a first path;
 (b) an imaging lens for focusing said light beam onto said field lens in said field lens plane;
 (c) first rotary reflecting means for intersecting said focused light beam in said first path at an angle less than 90° from an axial direction of said first path, for reflecting said focused light beam along a second path, said reflecting means including a mirror supported on one end of a first rotating shaft at an angle which is less than 90° from the longitudinal axis of said first shaft;
 (d) second rotary reflecting means for intersecting said light beam reflected from said first rotary reflecting means in said second path at an angle of less than 90° from a central axis of said reflected light beam, and for reflecting said reflected light beam along a third path which is different from said second path, said reflecting means including a mirror supported on one end of a second rotating shaft at an angle of less than 90° from the longitudinal axis of said second shaft;
 (e) means to rotate said first and second shafts in timed and phased relation to each other to cause said reflecting means to reflect said light beam in an elongated elliptical scan portion; and
 (f) detecting means for intersecting the light beam reflected from said second rotary reflecting means in said third path for detecting the presence of predetermined images in said reflected light beam.

17. An optical scanning device set forth in claim 16, wherein said elliptical scan pattern is in a horizontal plane.

18. An optical scanning device as set forth in claim 16, wherein said elliptical scan pattern is in a vertical plane.

19. An optical scanning device as set forth in claim 16, wherein said elliptical scan pattern rotates about the center line of said input beam.

20. An optical scanning device as set forth in claim 16, wherein, said elliptical scan pattern rotates about the center line of said third path.

* * * * *